United States Patent [19]

Hornaman et al.

[11] Patent Number: 6,143,118
[45] Date of Patent: Nov. 7, 2000

[54] METHOD FOR APPLICATION OF PRESSURE SENSITIVE ADHESIVE TO POROUS CARPET PAD

[75] Inventors: E. Chris Hornaman, Allentown; Thomas S. Jones, Wescosville, both of Pa.

[73] Assignee: Air Products and Chemicals, Inc., Allentown, Pa.

[21] Appl. No.: 08/416,668

[22] Filed: Apr. 5, 1995

Related U.S. Application Data

[63] Continuation-in-part of application No. 08/127,853, Sep. 28, 1993, abandoned.

[51] Int. Cl.[7] ........................................................ B44C 1/00
[52] U.S. Cl. ........................ 156/238; 156/230; 156/235; 156/249
[58] Field of Search .................................. 156/238, 249, 156/235, 230

[56] References Cited

U.S. PATENT DOCUMENTS

| | | | |
|---|---|---|---|
| 2,191,704 | 2/1940 | Bennett | 156/230 |
| 3,087,850 | 4/1963 | Cole | 156/230 |
| 4,035,218 | 7/1977 | Yount | 156/310 |
| 4,557,774 | 12/1985 | Hoopengardner . | |
| 4,797,170 | 1/1989 | Hoopengardner . | |
| 5,160,770 | 11/1992 | Hoopengardner . | |
| 5,221,394 | 6/1993 | Epple et al. . | |

FOREIGN PATENT DOCUMENTS

| | | |
|---|---|---|
| 2032083 | 6/1992 | Canada . |
| 7124118 | 6/1991 | Germany . |

*Primary Examiner*—John J. Gallagher
*Attorney, Agent, or Firm*—Mary E. Bongiorno

[57] ABSTRACT

A method for applying pressure sensitive adhesive (PSA) directly to one or both surfaces of carpet underlayment pads in which a liquid PSA polymer composition is first applied as a layer to a release substrate. The polymer layer is dried, forming a dried PSA film on the release substrate. The dried PSA film is then laminated to one or both surfaces of a carpet underlayment pad. Alternately, the film can be encased in a second substrate for storage and future application to a carpet underlayment pad.

13 Claims, No Drawings

METHOD FOR APPLICATION OF PRESSURE SENSITIVE ADHESIVE TO POROUS CARPET PAD

CROSS REFERENCE TO RELATED APPLICATIONS

This application is a continuation-in-part of Ser. No. 08/127,853, filed Sep. 28, 1993, now abandoned.

FIELD OF THE INVENTION

The invention relates to a method for applying pressure sensitive adhesive to one or both surfaces of a porous carpet underlayment pad.

BACKGROUND OF THE INVENTION

One of the problems facing the carpet industry is the production of a carpet underlayment pad which will hold the carpet in place and provide wear protection as well as a good cushion for the carpet. In order to prevent slippage between the carpet and the pad and between the pad and the surface on which it rests, adhesive coatings have traditionally been applied directly to the surface of carpets or underlayment pads. Typically, the carpet or pad is suspended on a tenter frame for application of the adhesive in the form of a frothed emulsion. The suspended carpet or pad is then passed through an oven to dry the adhesive coating. This method of application has several disadvantages. For example, liquid emulsion is absorbed into the inner layers of the porous surface before the adhesive dries which stiffens the carpet or pad and hinders its performance. The drying step can damage the synthetic fibers of the pad, especially if the pad contains heat sensitive synthetic fibers such as polypropylene, because drying is usually conducted at high temperatures in order to attain reasonable production speeds with ovens of reasonable length. In addition, the adhesive layer is often uneven because of the uneven surface of the carpet or pad and results in variable adhesive strength and wasted adhesive.

Examples of systems which have been devised to overcome the problems associated with direct application of adhesives to the surface of carpets and underlayment pads are described below.

German patent document 7124118.4 discloses covering at least one side of a carpet underlay, made of an elastic material such as polyvinyl chloride or foamed latex, with an adhesive glue based on dispersion. The adhesive glue is covered with a transparent foil which must be pulled off before use of the underlay.

U.S. Pat. No. 4,557,774 and U.S. Pat. No. 4,797,170 disclose installation of wall-to-wall carpet and pad without the need for stretching and tacking by using a pad with pressure-sensitive adhesive on one or both surfaces. To keep the adhesive at the surface of the foam pad, a sealant is applied to the pad before the pressure sensitive adhesive is applied or the pad is heat treated to form a stiffened surface or crust before application of the adhesive.

CA 2,032,083 discloses use of a hot melt pressure sensitive adhesive on the porous surface of carpet pads. It also discloses use of a pressure sensitive adhesive on the surface of a carpet pad which has first been treated with a film or sealant.

U.S. Pat. No. 5,160,770 discloses a carpet pad which has pressure sensitive adhesive preapplied on one or both surfaces for retaining the pad and carpet in place on the floor by adhesion without the need for stretching. When a water-based pressure sensitive adhesive is used, a coating or sealant is applied to the surface of the carpet pad before the pressure sensitive adhesive is applied in order to prevent wicking-in of the adhesive. The padding surface does not need to be coated when a hot melt adhesive is used.

U.S. Pat. No. 5,221,394 discloses a process for making backed, pressure-adherent carpeting wherein an adhesive is deposited as a layer on a supporting liner. The adhesive is then applied to one side of a backing film, and then, in a separate step, the other side of the backing film is heat-laminated to a web of carpeting to thereby reinforce the carpeting and provide it with an adhesive. The carpeting is both reinforced and rendered adherent in a single pass of the carpeting and at a single station in the carpet-manufacturing line.

SUMMARY OF THE INVENTION

This invention relates to a process for applying a substantially uniform and thin layer of a dried pressure sensitive adhesive (PSA) directly to one or both surfaces of a porous carpet underlayment pad. A PSA polymer composition, preferably in the form of an organic solution or an aqueous emulsion, is first applied to a release substrate. The polymer coating is then dried, forming a PSA film on the release substrate. The film can then be laminated, preferably at ambient temperature, to the surface of a carpet underlayment pad by contacting the PSA film side of the coated release substrate with the surface of the underlayment pad; for example, by passing the two components through nip rollers.

The major advantages of this invention are:

it provides a method for applying PSA to the surface of a carpet underlayment pad at ambient temperature;

it provides a method for applying PSA to the surface of a porous carpet underlayment pad without the need to close the porosity of the pad at its surface;

it minimizes penetration of the adhesive into the surface of the porous carpet pad;

it provides a method of applying a uniform layer of PSA directly to the surface of a porous carpet underlayment pad;

it provides a method for reducing the total amount of PSA (i.e., the dry add-on weight of PSA) needed to coat a carpet pad while retaining the required tack performance, compared to prior art processes in which wet or liquid PSA is applied directly to carpet pads; and it provides a method in which relatively low process temperatures can be used for drying the polymer composition which forms the PSA.

DETAILED DESCRIPTION OF THE INVENTION

An aqueous emulsion polymer composition or an organic solution polymer composition having pressure sensitive adhesive (PSA) properties is applied to a substrate which has a release coating. PSA polymer compositions have adhesive characteristics such that a 0.0254 mm (1 mil) film applied on a Mylar® (polyethylene terephthalate) substrate provides a bond strength of at least 175 newtons/m (1 lb/in) peel strength to stainless steel when tested according to PSTC (Pressure Sensitive Tape Council) Method 7. Examples of suitable PSA emulsion and solution polymer compositions comprise a polymer or copolymer of at least one ethylenically unsaturated monomer, for example acrylic monomers. Exemplary acrylic monomers include esters of acrylic acid with an alkyl group having from 1 to 18 carbon atoms, including methyl, ethyl, n-butyl, sec-butyl, the various isomeric pentyl, hexyl, heptyl, and octyl (especially 2-ethylhexyl), lauryl, cetyl, stearyl, and like groups; and alkyl esters of methacrylic acid with an alkyl group having from 4 to about 18 carbon atoms, including n-butyl, n-hexyl, 2-ethylhexyl, n-octyl, lauryl, cetyl, stearyl and like groups. Polymers derived from styrene and butadiene or styrene and isoprene are also suitable. The above polymer compositions may also contain other modifying monomers such as acrylic and methacrylic acid and their esters, vinyl acetate, ethylene, acrylonitrile, and styrene. In addition, tackifying resins can optionally be part of the compositions; for example, rosin and rosin derivatives such as rosin esters and hydrogenated rosin, tall oil and derivatives, or hydrocarbon resins well known in the PSA art. Wetting agents, defoamers, and possibly thickeners can also be added to the PSA polymer compositions to render them suitable for the coating process. Suitable PSA polymer compositions are commercially available; for example, acrylic polymer emulsions are commercially available as Flexbond®, Flexcryl® and Airbond® emulsions from Air Products and Chemicals, Inc., and others are available from Rohm and Haas Company and BASF.

Typically the release substrate is paper on which a silicone coating has been applied. Coated films, such as polyesters or polypropylene, or metal toil can also be used as release substrates. In addition, materials which have inherent release characteristics can be used as substrates; for example, untreated polyolefins such as polypropylene or polyethylene.

The liquid or wet PSA polymer composition is applied to the release coating side of the substrate. Application is accomplished with roll or spray equipment. Examples of equipment well known in the art for applying wet PSA compositions include: reverse roll coater, direct and reverse gravure, direct roll, wire-wound rod, slot die, curtain, knife-over roll, knife-over bed, or modifications and combinations of the aforementioned equipment.

After deposition on the release substrate, the polymer coating is dried to form a dry PSA film on the release side of the release substrate. Drying is done by passing the coated substrate through an oven at a temperature and airflow which when considered with the line speed is sufficient to dry the polymer film to a retained moisture level of less than about 5% by weight moisture; preferably not more than 2% by weight. For example, for single or multiple-zone ovens, the temperature ranges from about 65° C. to about 315° C. at a speed of about 3 to about 200 m/min. The distance traveled inside the oven, by the coated substrate, ranges from about 12 to about 60 meters.

The thickness of the dry film can range from about 0.013 mm (0.5 mils) to about 0.254 mm (10 mils) which corresponds to a coverage of about 13.5 $g/m^2$ to about 250 $g/^2$ (about 0.4 $oz/yd^2$ to about 7.4 $oz/yd^2$); preferably 0.0254 mm to 0.13 mm (1 mil to 5 mils) which corresponds to a coverage of about 25 $g/m^2$ to about 125 $g/m^2$ (about 0.74 $oz/yd^2$ to about 3.7 $oz/yd^2$).

The dried PSA film, coated on the release substrate, can then be laminated to one or both surfaces of an underlayment carpet pad. This step need not be done immediately after the drying process. A second release substrate can be applied to the dried PSA film so that the film can be rolled and/or stored for use at a future time. At time of use, one of the release substrates is removed to expose a surface of the adhesive film for application to a surface of the underlayment pad.

A critical aspect of the invention is drying the PSA before applying it to the carpet pad. By first drying the PSA, a much lower add-on coat weight of PSA can be applied to the pad as compared to prior art processes in which application of wet or liquid PSA results in absorption of some of the PSA into the pores of the pad and less PSA remaining at the surface of the pad to form the adhesive layer. In addition, by first drying the PSA and then applying it to the carpet pad, better tack is attained because the thickness of the PSA coating is more uniform over the entire surface of the carpet pad.

Other variations for application of a PSA film to a release substrate can be contemplated with this invention. For example, a substrate having a release coating on both sides enables application of the PSA polymer composition to both sides of the substrate. Alternatively, a substrate such as untreated polyethylene or polypropylene, with inherent release characteristics, can be used for application of the PSA polymer composition to both sides of the substrate. Subsequently, the PSA coating is dried and then one PSA film surface applied to a surface of an underlayment pad and the remaining PSA film surface applied to another surface, or another release substrate can be applied to one or both PSA surfaces depending on whether the PSA film coated substrate is stored separately or applied to an underlayment carpet pad and then stored with the underlayment pad.

In a preferred embodiment, a layer of a solution PSA composition or an emulsion PSA composition is applied to the release side of a release substrate and dried to form a PSA film on the substrate. A second release substrate is then applied to the adhesive film, so that the release side of the second release substrate is in contact with the adhesive and thereby encases the adhesive film. The film can then be rolled and/or stored for future application to a carpet underlayment pad. After it is applied to one side of an underlayment pad by removal of one of the release substrates, the pad and attached film can be stored by rolling or immediately applied to a second surface by removal of the second release substrate.

Underlayment carpet pads are typically constructed of foamed polymers, such as polyurethanes or rubber, or fibrous materials, for example synthetic felt or cotton material. Fibrous underlayment carpet pads may also contain a heat sensitive polymer fiber, for example polypropylene. The pads are typically characterized as being porous and absorbent to liquids.

The dried adhesive film is laminated to the underlayment carpet pad by contacting the PSA film and a surface of the underlayment pad so that the release substrate forms an outside surface. Any type of equipment known in the art for laminating PSA films to substrates can be used; for example, nip rollers. The PSA coated substrate and pad are passed between parallel rollers which are spaced at a distance sufficient to apply enough pressure to cause the PSA and the underlayment carpet pad to combine to form a permanent bond. Typical roller pressure ranges from about 0.4 kg/cm to about 17.6 kg/cm (about 2.5 lb/in to about 100 lb/in).

The lamination operation is preferably conducted at ambient temperature which helps preserve the integrity of the fibers which make up the underlayment pad. Since underlayment pads may contain heat sensitive polymer fibers, such as polypropylene, temperatures for application of adhesives to underlayment pads typically do not exceed 90° C.

EXAMPLE

Flexcryl® GP3 PSA emulsion (an acrylate polymer emulsion compounded with wetting and defoaming agents) was applied to a continuous strip of siliconized semi-bleached Kraft paper (22.7 kg/ream; 50 lb/ream) using a reverse roll coater. The coated substrate was then passed through a 4.3 m (14 ft) long oven maintained at 106° C. (223° F.) and 140° C. (284° F.) in sequential zones at a speed of 3.6 m/min (11.8 ft/min). The coating was 0.051 mm (2 mil) thick after drying. The dried coated web was then laminated to a needle punched felt carpet pad and the whole assembly was passed through nip rollers maintained at 374 newtons (84 lbs) gauge. Similarly, the opposite side of the carpet pad was laminated with the same adhesive. When the release substrate was peeled from the construction, the adhesive was observed to be securely anchored to the surface of the carpet pad. No penetration of the adhesive into the pad was observed.

Statement of Industrial Use

This process can be used to laminate dry pressure sensitive adhesive to one or both surfaces of porous carpet underlayment pads.

We claim:

1. A method for applying a pressure sensitive adhesive to a porous carpet underlayment pad comprising the steps of:
(a) applying a layer of a liquid pressure sensitive adhesive polymer composition to the release side of a release substrate;
(b) drying the pressure sensitive adhesive polymer-containing layer to form a dried pressure sensitive adhesive film on the release substrate; and
(c) contacting the dried pressure sensitive adhesive film to a surface of the carpet underlayment pad so that the release substrate forms an outer surface to the pressure sensitive adhesive film.

2. The method of claim 1 wherein the liquid pressure sensitive adhesive polymer composition is in the form of an aqueous emulsion or an organic solution.

3. The method of claim 1 wherein the carpet underlayment pad comprises heat sensitive synthetic polymer fibers.

4. The method of claim 3 wherein the heat sensitive synthetic polymer fiber is polypropylene.

5. The method of claim 1 wherein the thickness of the dried pressure sensitive adhesive film ranges from about 0.0254 mm to about 0.13 mm.

6. The method of claim 5 wherein the liquid pressure sensitive adhesive polymer composition comprises an acrylic base polymer or copolymer selected from the group consisting of 2-ethylhexyl acrylate and butyl acrylate.

7. The method of claim 6 wherein the moisture content of the dried pressure sensitive film is not more than about 2% by weight.

8. A method for applying a pressure sensitive adhesive to a porous carpet underlayment pad comprising:
(a) applying a layer of a pressure sensitive adhesive polymer aqueous emulsion or a pressure sensitive adhesive polymer organic solution to the release side of a first release substrate;
(b) drying the polymer-containing layer to form a dried pressure sensitive adhesive film on the first release substrate;
(c) applying a second release substrate to the dried adhesive film, so that the release side of the second release substrate is in contact with the adhesive, to form an encased adhesive film;
(d) removing one of the release substrates from the encased adhesive film to expose a surface of the pressure sensitive adhesive film; and
(e) contacting the exposed pressure sensitive adhesive film to a surface of the carpet underlayment pad so that the other release substrate forms an outer surface to the pressure sensitive adhesive film.

9. The method of claim 8 wherein the carpet underlayment pad comprises heat sensitive synthetic polymer fibers.

10. The method of claim 9 wherein the heat sensitive synthetic polymer fiber is polypropylene.

11. The method of claim 8 wherein the thickness of the dried pressure sensitive adhesive film ranges from about 0.0254 mm to about 0.13 mm.

12. The method of claim 11 wherein the pressure sensitive adhesive polymer emulsion or solution comprises an acrylic base polymer or copolymer selected from the group consisting of 2-ethylhexyl acrylate and butyl acrylate.

13. The method of claim 12 wherein the moisture content of the dried pressure sensitive adhesive film is not more than about 2% by weight.

* * * * *